United States Patent
Kitao et al.

(10) Patent No.: US 10,447,096 B2
(45) Date of Patent: Oct. 15, 2019

(54) PERMANENT-MAGNET-TYPE ROTATING ELECTRICAL MACHINE

(71) Applicant: MITSUBISHI ELECTRIC CORPORATION, Chiyoda-ku (JP)

(72) Inventors: Junji Kitao, Chiyoda-ku (JP); Moriyuki Hazeyama, Chiyoda-ku (JP); Yoshihiro Miyama, Chiyoda-ku (JP); Takeshi Mori, Chiyoda-ku (JP); Akihiro Daikoku, Chiyoda-ku (JP)

(73) Assignee: MITSUBISHI ELECTRIC CORPORATIOn, Chiyoda-ku (JP)

( * ) Notice: Subject to any disclaimer, the term of this patent is extended or adjusted under 35 U.S.C. 154(b) by 345 days.

(21) Appl. No.: 15/538,065

(22) PCT Filed: Nov. 18, 2015

(86) PCT No.: PCT/JP2015/082413
§ 371 (c)(1),
(2) Date: Jun. 20, 2017

(87) PCT Pub. No.: WO2016/117217
PCT Pub. Date: Jul. 28, 2016

(65) Prior Publication Data
US 2017/0346353 A1    Nov. 30, 2017

(30) Foreign Application Priority Data

Jan. 20, 2015   (JP) ................................ 2015-008680

(51) Int. Cl.
*H02K 1/16*     (2006.01)
*H02P 27/06*    (2006.01)
(Continued)

(52) U.S. Cl.
CPC ............... *H02K 1/16* (2013.01); *H02K 1/146* (2013.01); *H02K 1/276* (2013.01); *H02K 1/2766* (2013.01);
(Continued)

(58) Field of Classification Search
CPC .......... H02K 1/16; H02K 1/146; H02K 1/276; H02K 1/2766; H02K 29/03;
(Continued)

(56) References Cited

U.S. PATENT DOCUMENTS

2004/0130236 A1    7/2004  Yonekura
2006/0055267 A1    3/2006  Arimitsu et al.

FOREIGN PATENT DOCUMENTS

DE    10 2007 030 508 A1    1/2009
JP         2006-81377 A       3/2006
(Continued)

OTHER PUBLICATIONS

International Search Report dated Feb. 16, 2016 in PCT/JP2015/082413 filed Nov. 18, 2015.
(Continued)

*Primary Examiner* — Mohamad A Musleh
(74) *Attorney, Agent, or Firm* — Oblon, McClelland, Maier & Neustadt, L.L.P.

(57) ABSTRACT

Given a first intersection point of the surface of a rotor and a straight line that joins a central point of a permanent magnet on a stator side and a tooth tip section closest to the central point of the permanent magnet on the stator side, a flange is formed outward of an arc having, as the radius thereof, a distance from a second intersection point of the inner peripheral face of the stator and a straight line that joins the rotation axis of the rotor and the first intersection point, up to the tooth tip section.

8 Claims, 12 Drawing Sheets

(51) Int. Cl.
*H02K 1/27* (2006.01)
*H02P 21/06* (2016.01)
*H02P 25/22* (2006.01)
*H02K 1/14* (2006.01)
*H02P 29/66* (2016.01)
*H02K 29/03* (2006.01)
*H02P 21/14* (2016.01)

(52) U.S. Cl.
CPC .............. *H02P 21/06* (2013.01); *H02P 25/22* (2013.01); *H02P 27/06* (2013.01); *H02K 29/03* (2013.01); *H02K 2201/06* (2013.01); *H02P 21/141* (2013.01); *H02P 29/662* (2016.11)

(58) Field of Classification Search
CPC ..... H02K 2201/06; H02P 21/06; H02P 25/22; H02P 27/06; H02P 29/662; H02P 21/141
See application file for complete search history.

(56) References Cited

FOREIGN PATENT DOCUMENTS

JP 3885732 B2 2/2007
WO WO 2014/180737 A2 11/2014

OTHER PUBLICATIONS

Takafumi Hara et al., "Proposal of Vibration Control Reducing $2^{nd}$ Radial Electromagnetic Force", IEEJ Industry Applications Society Conference, 2014, No. 3-58, pp. III-315-III-320 (with English abstract).
Office Action dated Mar. 26, 2018 in German Patent Application No. 11 2015 006 002.2 with English translation, 15 pages.

PERMANENT-MAGNET-TYPE ROTATING ELECTRICAL MACHINE

TECHNICAL FIELD

The present invention relates to a permanent-magnet-type rotating electrical machine that utilizes permanent magnets in a rotor, the machine being used, for instance, in industrial rotating electrical machines and automotive rotating electrical machines.

BACKGROUND ART

Permanent-magnet-type rotating electrical machines utilizing permanent magnets that do not require supply of magnetic field energy from outside are widely used in order to meet the demand for smaller sizes and higher outputs in industrial rotating electrical machines and in automotive rotating electrical machines that are used, for instance, in electric vehicles and hybrid automobiles.

The structure of the stator windings of a permanent-magnet-type rotating electrical machine is roughly divided into concentrated winding, in which a given coil is wound around one tooth, and distributed winding in which a given coil is wound across a plurality of teeth. Herein coil end length is shorter in concentrated winding than in distributed winding, and hence the axial length of the rotating electric machine can be shortened.

On the other hand, the magnetomotive force generated by the stator windings with concentrated winding includes low-order harmonic components that do not contribute to torque. These harmonic components give rise to the problem of increases in torque ripples, and occurrence of electromagnetic excitation force of low-order deformation mode. At specific revolutions at which the electromagnetic excitation force matches the resonant frequencies of parts of the rotating electrical machine such as a stator or frame, the electromagnetic excitation force resonates with these parts, and noise occurs as a result.

In order to reduce torque ripples, therefore, a permanent-magnet-type rotating electrical machine has been proposed (for instance PTL 1) that is provided with a plurality of types of steel plates stacked in the axial direction, the plurality of types of steel plates being disposed in such a manner that the central positions of tooth tips of the stator in the circumferential direction are offset, in the circumferential direction, from the center of a tooth body.

In order to reduce the electromagnetic excitation force a method has also been proposed (for instance, NPL 1) that involves calculating an appropriate negative d-axis (flux axis) current for which the electromagnetic excitation force is minimized, when stator windings are energized with a negative d-axis current.

CITATION LIST

Patent Literature

[PTL 1] Japanese Patent No. 3885732

Non Patent Literature

[NPL 1] Takafumi HARA and four others; "Proposal of Vibration Control Reducing 2nd Radial Electromagnetic Force", 2014 IEEJ Industry Applications Society Conference, No. 3-58, pp. III-315 to III-320

SUMMARY OF INVENTION

Technical Problem

In permanent-magnet-type rotating electrical machines of concentrated winding, as described above, there occurs electromagnetic excitation force of low-order deformation mode due to the influence of low-order harmonic components included in the magnetomotive force that is generated by concentrated stator windings. At specific revolutions where the electromagnetic excitation force matches the resonant frequency of parts of the rotating electrical machine, the electromagnetic excitation force resonates with these parts, giving rise to noise.

To address this, NPL 1 proposes a method that involves calculating an appropriate negative d-axis current, in a case where the electromagnetic excitation force is to be reduced through energization of the stator windings with a negative d-axis current. PTL 1 discloses nothing regarding reduction of the electromagnetic excitation force.

In some instances, however, the stator windings may have to be energized with a negative d-axis current in order to suppress voltage, during high-speed rotation of the permanent-magnet-type rotating electrical machine. Accordingly, if the negative d-axis current for which the electromagnetic excitation force is minimized is smaller than the negative d-axis current required for voltage suppression, at specific revolutions where the electromagnetic excitation force matches the resonant frequency of parts of the rotating electrical machine, a problem arises in that the permanent-magnet-type rotating electrical machine cannot be driven with the negative d-axis current for which the electromagnetic excitation force is minimized.

It is an object of the present invention, arrived at in order to solve the above problem, to obtain a permanent-magnet-type rotating electrical machine that can be driven with a negative d-axis current for which the electromagnetic excitation force is minimized, at specific revolutions at which the electromagnetic excitation force matches the resonant frequency of parts of the rotating electrical machine.

Solution to Problem

The permanent-magnet-type rotating electrical machine according to the present invention is a permanent-magnet-type rotating electrical machine having a rotor that forms a magnetic field using permanent magnets, and a stator that opposes the rotor across a gap, wherein the stator has teeth protruding towards the rotor side, and a core back; the teeth each include a tooth central section around which a winding is wound, a tooth tip section which opposes the rotor and around which no winding is wound, and a flange which is formed between the tooth central section and the tooth tip section and protrudes on both sides in a circumferential direction; and given a first intersection point of a surface of the rotor and a straight line that joins a central point of a permanent magnet on the stator side and the tooth tip section closest to the central point of the permanent magnet on the stator side, the flange is formed outward of an arc having, as the radius thereof, a distance from a second intersection point of an inner peripheral face of the stator and a straight line that joins a rotation axis of the rotor and the first intersection point, up to the tooth tip section.

Advantageous Effects of Invention

In the permanent-magnet-type rotating electrical machine according to the present invention, given a first intersection point of a surface of the rotor and a straight line that joins a central point of a permanent magnet on the stator side and the tooth tip section closest to the central point of the permanent magnet on the stator side, the flange is formed outward of an arc having, as the radius thereof, a distance from a second intersection point of the stator inner peripheral face and a straight line that joins the rotation axis of the rotor and the first intersection point, up to the tooth tip section.

Accordingly, it becomes possible to drive the permanent-magnet-type rotating electrical machine with a negative d-axis current for which the electromagnetic excitation force is minimized, at specific revolutions at which the electromagnetic excitation force matches the resonant frequency of parts of the rotating electrical machine.

DESCRIPTION OF EMBODIMENTS

Preferred embodiments of the permanent-magnet-type rotating electrical machine according to the present invention will be explained next with reference to accompanying drawings. In the explanation that follows, identical or corresponding portions in the figures will be denoted with identical reference symbols.

Embodiment 1

Figure 1:
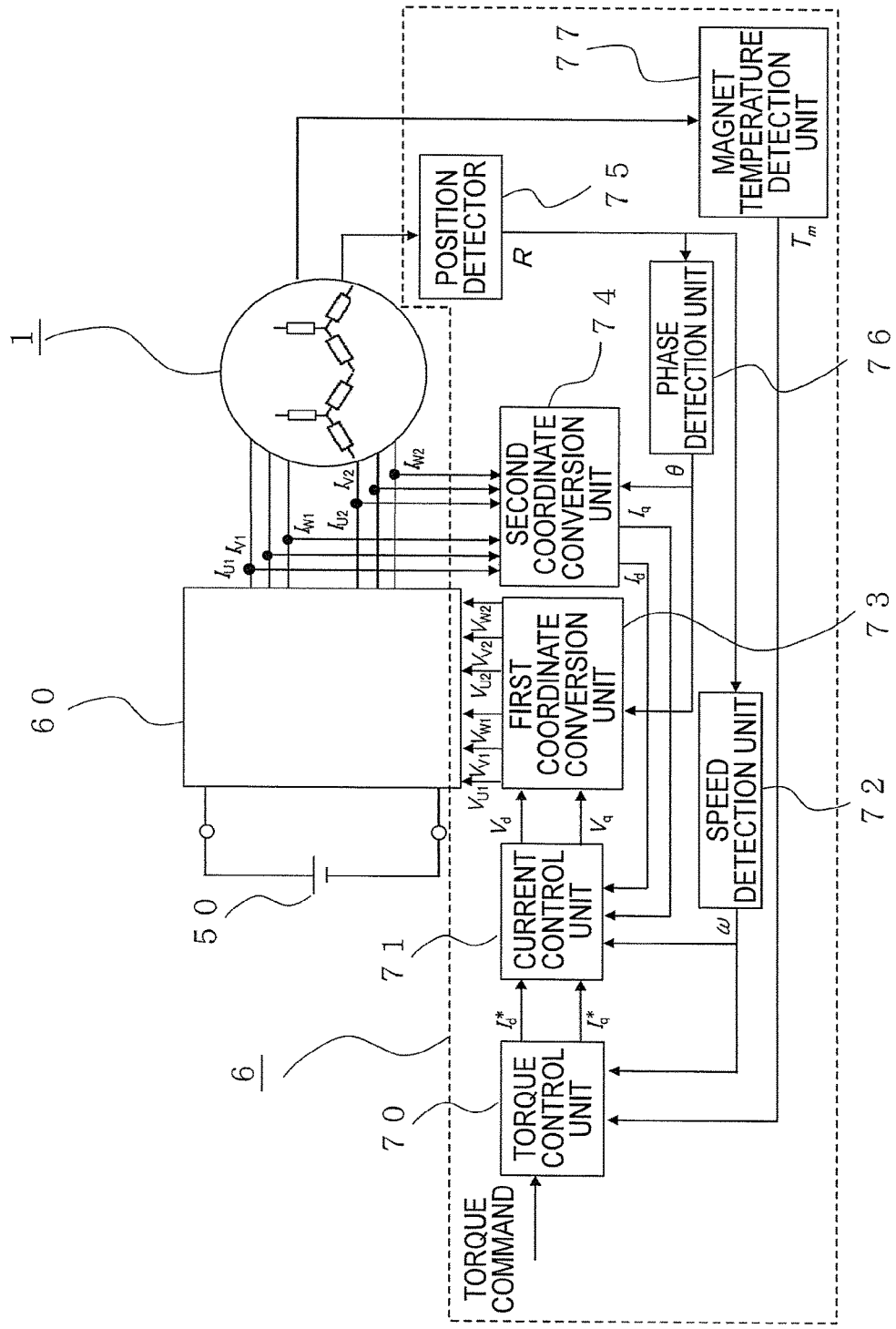
FIG. 1 is a block configuration diagram illustrating a driving system for driving a permanent-magnet-type rotating electrical machine according to Embodiment 1 of the present invention.

FIG. 1 is a block configuration diagram illustrating a driving system for driving a permanent-magnet-type rotating electrical machine according to Embodiment 1 of the present invention. In FIG. 1, the driving system, the purpose of which is to drive a permanent-magnet-type rotating electrical machine 1, is provided with a battery 50, an inverter 60 and a control device 6.

The inverter 60 converts DC power and AC power to each other. The battery 50 that charges and discharges DC power is connected to the DC-side of the inverter 60, while the permanent-magnet-type rotating electrical machine 1, which converts AC power and mechanical energy to each other via two sets of three-phase windings, is connected to the AC-side of the inverter 60. The detailed configuration and operation of the control device 6 will be described further on.

Figure 2:
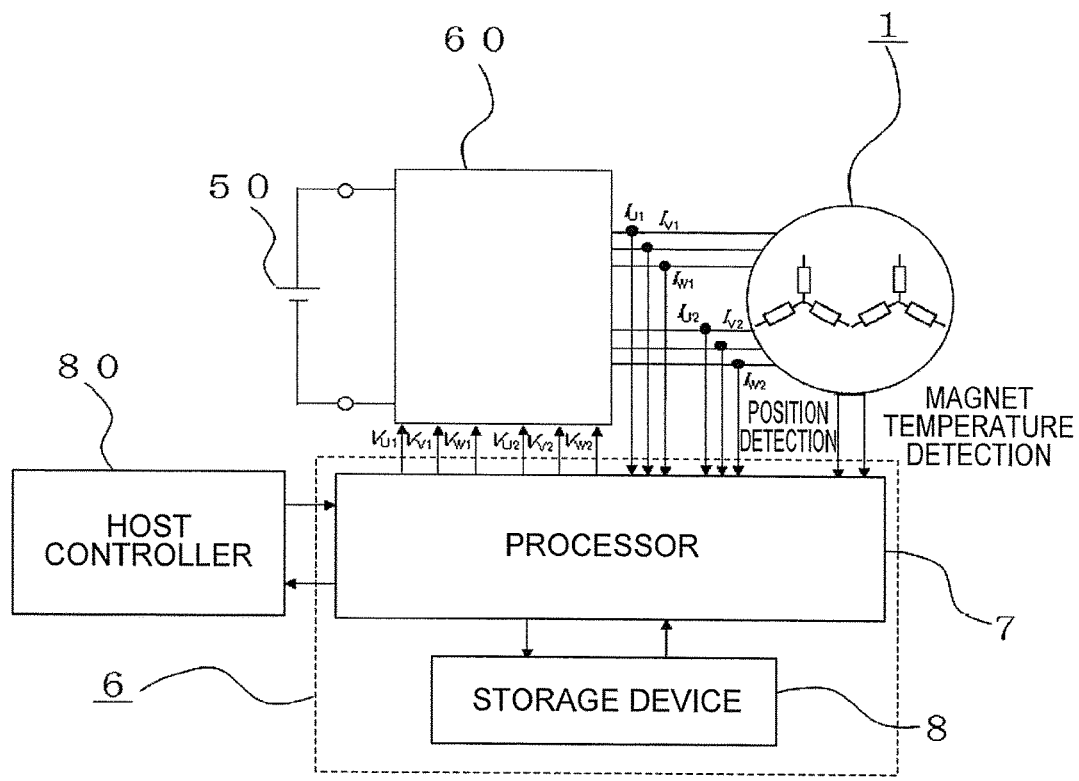
FIG. 2 is a hardware configuration diagram illustrating the driving system for driving the permanent-magnet-type rotating electrical machine according to Embodiment 1 of the present invention.

FIG. 2 is a hardware configuration diagram illustrating the driving system for driving the permanent-magnet-type rotating electrical machine according to Embodiment 1 of the present invention. In FIG. 2, the driving system is further provided with a host controller 80, in addition to the battery 50, inverter 60 and control device 6 of FIG. 1. The control device 6 is provided with a processor 7 and a storage device 8, as hardware.

Although not illustrated in the figure, the storage device 8 is provided with a volatile storage device such as a random access memory, and with a non-volatile auxiliary storage device such as a flash memory. Although not illustrated in the figure, the storage device 8 may be provided with a volatile storage device such as a random access memory, and with an auxiliary storage device such as a hard disk, instead of a non-volatile auxiliary storage device.

The processor 7 executes a program inputted from the storage device 8. The storage device 8 is provided with the auxiliary storage device and the volatile storage device, and accordingly a program is inputted from the auxiliary storage device to the processor 7 via the volatile storage device. The processor 7 may output data such as calculation results to the volatile storage device of the storage device 8, or may save the data in the auxiliary storage device via the volatile storage device. Input and output of data and so forth between the hardware constituent elements in FIG. 2 will be described below.

Figure 3:
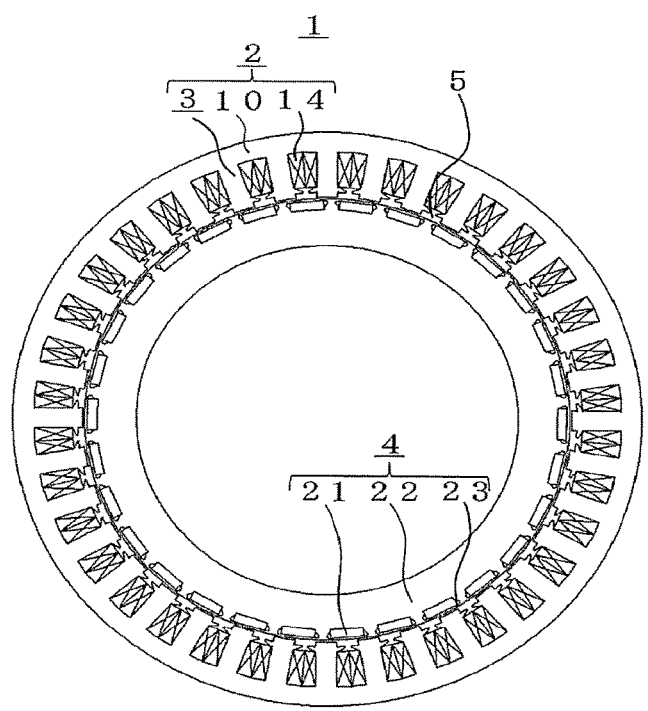
FIG. 3 is a cross-sectional diagram, perpendicular to the axial direction, of the permanent-magnet-type rotating electrical machine according to Embodiment 1 of the present invention.

FIG. 3 is a cross-sectional diagram, perpendicular to the axial direction, of the permanent-magnet-type rotating electrical machine according to Embodiment 1 of the present invention. The permanent-magnet-type rotating electrical machine 1 illustrated in FIG. 3 is a permanent-magnet-type rotating electrical machine 1 having 30 poles and 36 slots. In FIG. 3, the permanent-magnet-type rotating electrical machine 1 is provided with a rotor 4 disposed inside a substantially cylindrical stator 2, leaving a predetermined gap 5 with respect to the latter. The stator 2 and the rotor 4 are configured to be centered on a same rotation axis, not shown.

The stator 2 has teeth 3 protruding towards the rotor 4 side, and a core back 10. Coils are densely wound around the teeth 3 via insulators (not shown) molded out of resin or the like, to constitute windings 14. One end of each winding 14 wound on the teeth 3 is connected to the inverter 60 side, and the other end is connected to a neutral wire of another winding 14 as a neutral wire, not shown.

The rotor 4 has: a rotor core 22 the outer periphery whereof is substantially a cylindrical surface, a rotary shaft fitted to the rotor core 22 and running through the axial center position of the latter, and the rotary shaft (not shown) being integrated with the rotor core 22 by being fixed to the latter for instance through press-fitting, shrink-fitting, or by way of keys and the like; and permanent magnets 21 of substantially rectangular shape disposed inside the rotor core 22.

The permanent magnets 21 are fixed to the rotor core 22 by way of an adhesive or the like. Inter-magnet gaps 23 are provided in order to prevent short-circuiting of the magnetic flux generated by the permanent magnets 21, inside the rotor core 22, and to relieve the stress on the rotor core 22.

The rotor core 22 is configured in the form of magnetic members stacked in the axial direction, by means of through-bolts, pins or crimping. The teeth 3 and the core back 10 that form the stator 2 are likewise stacks of magnetic members in the axial direction.

Vector control of the permanent-magnet-type rotating electrical machine 1 will be explained next. Firstly, the d-axis direction is defined as the direction of a current component that generates magnetic flux in the same direction as that of the magnet magnetic field, centered on the magnetic poles of the rotor 4, and the q-axis direction is defined as the direction of the current component that generates torque in the rotor 4 between the magnetic poles of the rotor 4, the q-axis direction being orthogonal to the d-axis direction.

Current vectors are generated through combination of a d-axis current $I_d$ being a current component in the d-axis direction and a q-axis current $I_q$ being a current component in the q-axis direction. Such vector control where the permanent-magnet-type rotating electrical machine 1 is controlled using three-phase AC currents generated in the stator 2 is a widely used scheme.

Returning to FIG. 1, the control device 6 has a torque control unit 70, a current control unit 71, a speed detection unit 72, a first coordinate conversion unit 73, a second coordinate conversion unit 74, a position detector 75, a phase detection unit 76 and a magnet temperature detection unit 77.

In the control device 6, two sets of three-phase AC currents $I_{U1}$, $I_{V1}$, $I_{W1}$ and $I_{U2}$, $I_{V2}$, $I_{W2}$ of the permanent-magnet-type rotating electrical machine 1, as detected by a current detector not shown, are inputted to the second coordinate conversion unit 74. The position detector 75 detects, and outputs, a rotational position R of the rotor 4 of the permanent-magnet-type rotating electrical machine 1.

The speed detection unit 72 detects a rotational speed ω on the basis of the rotational position R outputted by the position detector 75, and outputs the detected rotational speed ω. The phase detection unit 76 detects a phase θ on the basis of the rotational position R outputted by the position detector 75, and then outputs the phase θ. The magnet temperature detection unit 77 detects, and outputs, a magnet temperature $T_m$ of the permanent magnets 21 of the rotor 4. The magnet temperature detection unit 77 may measure or estimate the magnet temperature $T_m$.

On the basis of the phase θ, the second coordinate conversion unit 74 converts the two sets of three-phase AC currents $I_{U1}$, $I_{V1}$, $I_{W1}$ and $I_{U2}$, $I_{V2}$, $I_{W2}$ from three phases to two phases, and outputs respective currents $I_d$, $I_q$ in the dq-axes. When each set of three-phase AC currents is converted from three phases to two phases, there are generated two sets of current components in the dq-axes, and the second coordinate conversion unit 74 averages the two sets of current components in the dq-axes and outputs the result.

The torque control unit 70 has a storage unit not shown, and outputs current commands $I_d^*$, $I_q^*$ in the dq-axes, on the basis of a torque command issued by the external host controller 80 of the control device 6, the rotational speed ω from the speed detection unit 72, and the magnet temperature $T_m$ from the magnet temperature detection unit 77. The current commands $I_d^*$, $I_q^*$ are established in such a manner that the electromagnetic excitation force is minimized, in accordance with the magnet temperature $T_m$ of the permanent magnets 21.

The current control unit 71 performs feedback control in such a manner that currents $I_d$, $I_q$ track the current commands $I_d^*$, $I_q^*$, on the basis of the current commands $I_d^*$, $I_q^*$, from the torque control unit 70, the currents $I_d$, $I_q$ from the second coordinate conversion unit 74 and the rotational speed ω from the speed detection unit 72, and outputs voltage commands $V_d^*$, $V_q^*$ in the dq-axes.

The first coordinate conversion unit 73 converts the voltage commands $V_d^*$, from the current control unit 71 from two phases to three phases, on the basis of phase θ, and outputs two sets of three-phase voltage command values $V_{U1}$, $V_{V1}$, $V_{W1}$ and $V_{U2}$, $V_{V2}$, $V_{W2}$. The amplitudes of the two sets of three-phase voltage command values are mutually identical, while time phases differ from each other by 30°. The inverter 60 is controlled according to the two sets of three-phase voltage command values $V_{U1}$, $V_{V1}$, $V_{W1}$ and $V_{U2}$, $V_{V2}$, $V_{W2}$.

The torque control unit 70, current control unit 71, speed detection unit 72, first coordinate conversion unit 73, second coordinate conversion unit 74, position detector 75, phase detection unit 76 and magnet temperature detection unit 77 of FIG. 1 are realized by the processor 7 that executes a program stored in the storage device 8, or by a processing circuit such as a system LSI, not shown. The above functions may be executed concertedly by a plurality of processors 7 and a plurality of storage devices 8, or may be executed concertedly by a plurality of processing circuits.

Further, the above functions may be executed concertedly by combinations of the plurality of processors 7 and the plurality of storage devices 8, and of the plurality of processing circuits. Respective processes in the position detector 75 and the magnet temperature detection unit 77 may be executed by the hardware itself of the position detector 75 and of the magnet temperature detection unit 77.

Figure 4:
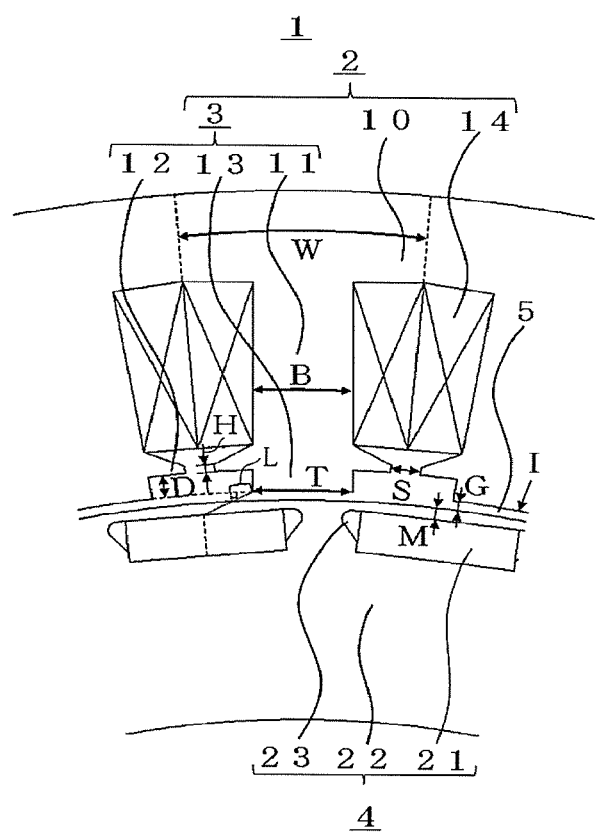
FIG. 4 is an enlarged-view diagram of an enlargement of a cross-section, perpendicular to the axial direction, of the permanent-magnet-type rotating electrical machine according to Embodiment 1 of the present invention.
Figure 5:
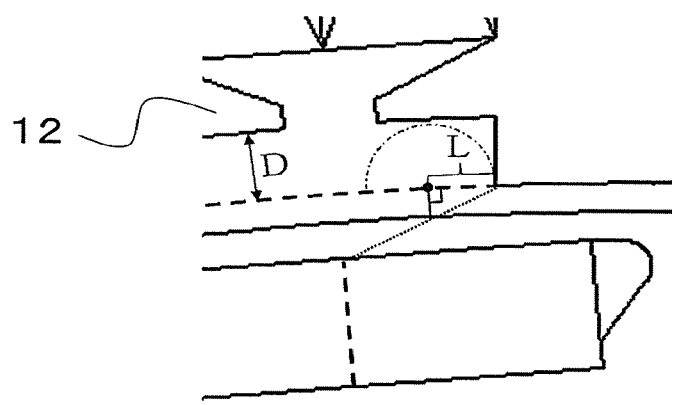
FIG. 5 is an enlarged-view diagram of a tooth tip section of the permanent-magnet-type rotating electrical machine according to Embodiment 1 of the present invention.

The detailed structure of the permanent-magnet-type rotating electrical machine 1 will be explained next with reference to FIG. 4 and FIG. 5. FIG. 4 is an enlarged-view diagram of an enlargement of a cross-section, perpendicular to the axial direction, of the permanent-magnet-type rotating electrical machine according to Embodiment 1 of the present invention. FIG. 5 is an enlarged-view diagram of a tooth tip section of the permanent-magnet-type rotating electrical machine according to Embodiment 1 of the present invention.

In FIG. 4 and FIG. 5, each tooth 3 has a tooth central section 11 around which a respective winding 14 is wound, a tooth tip section 13 opposing the rotor 4 and around which no winding 14 is wound, and a flange 12 formed between the tooth central section 11 and the tooth tip section 13, and that protrudes on both sides in the circumferential direction.

In FIG. 4 and FIG. 5, W (°) is the electrical angle per slot, about the rotation axis not shown; T (°) is the electrical angle of the tooth tip section 13 about the rotation axis; D is the distance between the rotor 4-side surface of the flange 12 and the inner peripheral face of the stator 2 defined by the rotor 4-side surface of the tooth tip section 13; G is the distance between the tooth tip section 13 and the rotor 4 forming the gap 5; M is the distance between the central portion of each permanent magnet 21 on the stator 2 side and the surface of the rotor core 22; I is the inner diameter of the stator 2; S is the width (slot opening) between adjacent flanges 12; H is the minimum height of the flange 12; and B is the minimum body width of the tooth central section 11.

In a case where the rotor 4-side surface of the flange 12 and the rotor core 22 are parallel to each other, L denotes a distance, up to the tooth tip section 13, from an intersection point between the inner peripheral face of the stator 2 and a straight line that joins the rotation axis, not shown, and an intersection point between the surface of the rotor 4 and a straight line that joins the stator 2-side central portion of each permanent magnet 21 and the tooth tip section 13 closest to the stator 2-side central portion of that permanent magnet 21. The inner peripheral face of the stator 2 denotes the entire circumference having the inner peripheral face of the tooth tip section 13 as the radius thereof, and includes as well the identical radial direction positions of the inner peripheral face of the tooth tip section 13 and the gaps between teeth 3. The distance L is defined according to Expression (1) below, and the flange 12 is formed so that there holds D≥L.

[Math. 1]

$$L = \frac{G}{M+G} \times I \times \frac{W-T}{2} \times \frac{\pi}{180} \qquad (1)$$

The effect of the permanent-magnet-type rotating electrical machine 1 having the above configuration will be explained next. An explanation follows first on the manner in which there is established the d-axis current of the permanent-magnet-type rotating electrical machine 1 under a given voltage. The rotor 4 having the permanent magnets 21 disposed therein generates constant magnetic flux regardless of the revolutions. In the permanent-magnet-type rotating electrical machine 1 that utilizes the permanent magnets 21 as a field source, therefore, a counter electromotive force is generated in the windings 14 on account of the flux of the permanent magnets 21 as the revolutions increase.

Once given revolutions are reached, the counter electromotive force becomes identical to the voltage of the battery 50, and no current can be caused to flow in the windings 14. Therefore, the revolutions cannot be raised beyond those revolutions. In order to prevent that phenomenon, the windings 14 are energized with a negative d-axis current that weakens the magnetic field derived from the permanent magnets 21.

Figure 6:
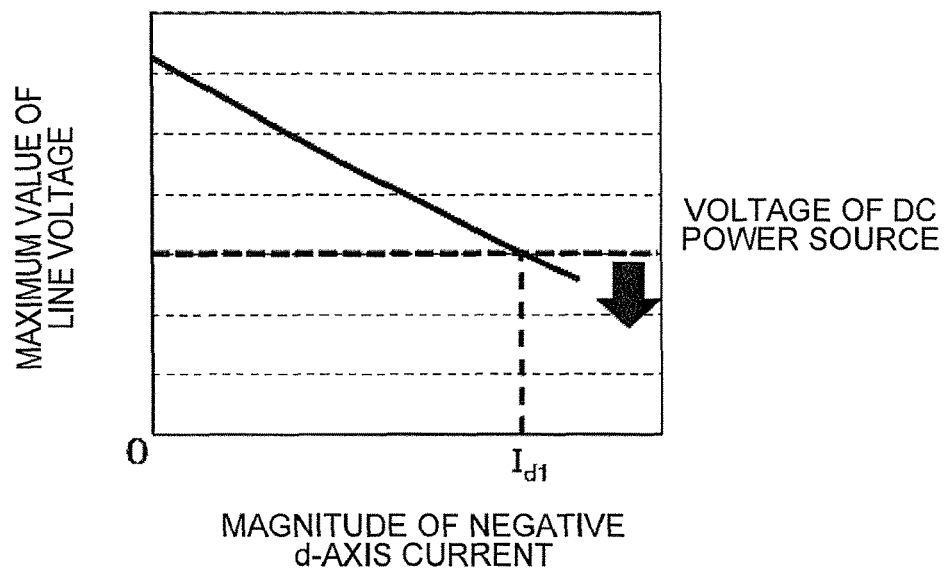
FIG. 6 is an explanatory diagram illustrating a relationship between a negative d-axis current in the absence of load and a maximum value of line voltage in the permanent-magnet-type rotating electrical machine according to Embodiment 1 of the present invention.

FIG. 6 is an explanatory diagram illustrating a relationship between a negative d-axis current in the absence of load and a maximum value of line voltage in the permanent-magnet-type rotating electrical machine according to Embodiment 1 of the present invention. FIG. 6 reveals that the maximum value of line voltage decreases gradually with increasing magnitude of the negative d-axis current, and drops below the voltage of the DC power source at a given negative d-axis current.

Herein $I_{d1}$ denotes the negative d-axis current for which the maximum value of line voltage at given revolutions is lower than the voltage of the DC power source. In the permanent-magnet-type rotating electrical machine 1, the counter electromotive force generated in the windings 14 i.e.

the maximum value of line voltage, increases with increasing revolutions, and hence the d-axis current $I_{d1}$ as well increases with increasing revolutions.

The causes underlying the electromagnetic excitation force will be explained next. The electromagnetic excitation force is an electromagnetic oscillation source caused by harmonic components of flux density that occur in the gap 5. When the deformation mode and natural frequency of a structure such as the stator 2 or a frame, not shown, match the electromagnetic excitation force, the structure resonates and noise occurs as a result.

It is ordinarily known that a permanent-magnet-type rotating electrical machine 1 of concentrated winding, having the windings 14 wound densely around the teeth 3, has a peak value of electromagnetic excitation force for a low-order deformation mode/time order. The deformation mode/time order of the electromagnetic excitation force occurring in the permanent-magnet-type rotating electrical machine 1 will be explained next.

The electromagnetic excitation force arises for a specific deformation mode/time order as a result of a combination of harmonic components of flux density in the gap 5, the harmonic components arising in turn according to the number of slots of the stator 2 and the number of poles of the rotor 4. In the permanent-magnet-type rotating electrical machine 1 of Embodiment 1 of the present invention the number of poles is 30 and the number of slots is 36.

A harmonic component $B_{rt}$ of flux density generated by the rotor 4 results from a combination of the magnetomotive force $f_{mg}$ generated by the permanent magnets 21 and a variation $p_{st}$ in magnetoresistance derived from the number of slots of the stator 2, as given by Expression (2) below. In Expression (2), x denotes spatial order and y denotes time order, with signs obeying no particular sequence.

[Math. 2]

$$(x_{Brt}, y_{Brt}) = \pm(x_{fmg}, y_{fmg}) \pm (x_{pst}, y_{pst}) \quad (2)$$

In the rotor 4 having 30 poles, specifically, there arise components such as (15, 1), (30, 2), (45, 3) as the magnetomotive force ($x_{fmg}$, $y_{fmg}$) of the permanent magnets 21. In the stator 2 having 36 slots there arise for instance (0, 0), (36, 0), (72, 0) as the variation component ($x_{pst}$, $y_{pst}$) of magnetoresistance. The harmonic component ($x_{Brt}$, $y_{Brt}$) of flux density generated by the rotor 4 results from a combination given by Expression (3) below.

[Math. 3]

$$(x1_{Brt}, y1_{Brt}) = (15, 1) = (15, 1) = (15, 1) + (0, 0)$$

$$(x2_{Brt}, y2_{Brt}) = (21, -1) = -(15, 1) + (36, 0) \quad (3)$$

The harmonic component $B_{st}$ of the flux density generated by the stator 2 results from a combination of the magnetomotive force $f_{st}$ generated by the windings 14 of the stator 2 and a variation $p_{rt}$ in magnetoresistance derived from the rotor 4, as given by Expression (4) below. The signs in Expression (4) obey no particular order.

[Math. 4]

$$(x_{Bst}, y_{Bst}) = \pm(x_{fst}, y_{fst}) \pm (x_{prt}, y_{prt}) \quad (4)$$

Specifically, there arise components such as (15, 1), (21, -1) as the magnetomotive force ($x_{fst}$, $y_{fst}$) generated by the windings 14 of the permanent-magnet-type rotating electrical machine 1 according to Embodiment 1 of the present invention. In the rotor 4 there arises for instance (0, 0) as the variation component ($x_{prt}$, $y_{prt}$) of magnetoresistance. Herein the harmonic component ($x_{Bst}$, $y_{Bst}$) of flux density generated by the stator 2 results from a combination given by Expression (5) below.

[Math. 5]

$$(x1_{Bst}, y1_{Bst}) = (15, 1) = (15, 1) + (0, 0)$$

$$(x2_{Bst}, y2_{Bst}) = (21, -1) = (21, -1) + (0, 0) \quad (5)$$

As is known, the electromagnetic excitation force $f_{emf}$ is proportional to the square of flux density occurring in the gap 5, on the basis of a relational expression of Maxwell stress given by Expression (6) below.

[Math. 6]

$$f_{emf} \propto B^2 = (B_{st} + B_{rt})^2 \quad (6)$$

In the permanent-magnet-type rotating electrical machine 1 according to Embodiment 1 of the present invention, therefore, there arise components ((21, -1)-(15, 1)) of deformation mode 6/second-order time order, for instance derived from flux density components (15, 1) and (21, -1) occurring in the gap 5.

Figure 7:
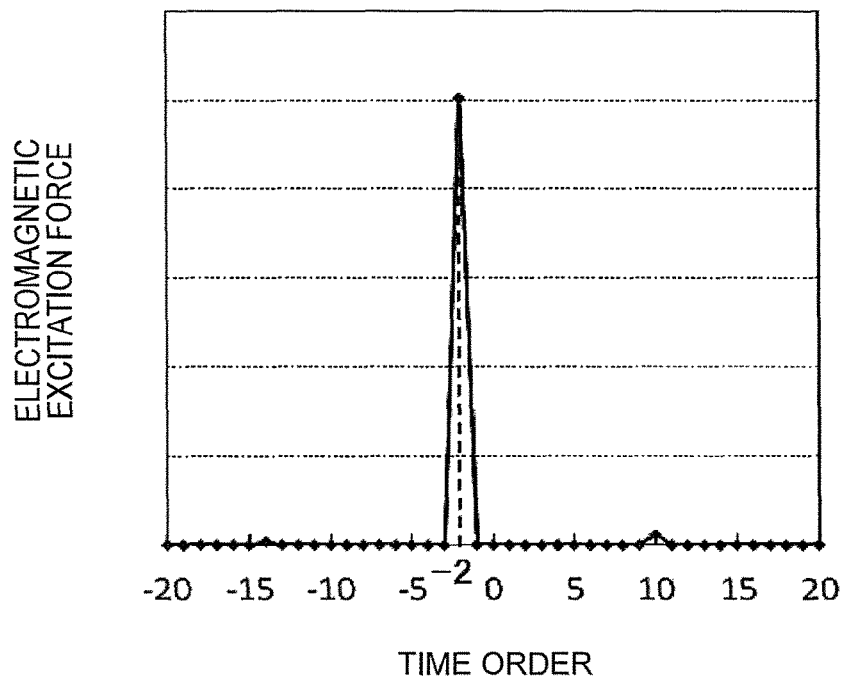
FIG. 7 is an explanatory diagram of a relationship, worked out by magnetic field analysis, between time order and electromagnetic excitation force of deformation mode 6 occurring in the permanent-magnet-type rotating electrical machine according to Embodiment 1 of the present invention.

FIG. 7 is an explanatory diagram of a relationship, worked out by magnetic field analysis, between time order and electromagnetic excitation force of deformation mode 6 occurring in the permanent-magnet-type rotating electrical machine according to Embodiment 1 of the present invention. FIG. 7 reveals a peak value of electromagnetic excitation force at the second-order time order, for deformation mode 6.

Figure 8:
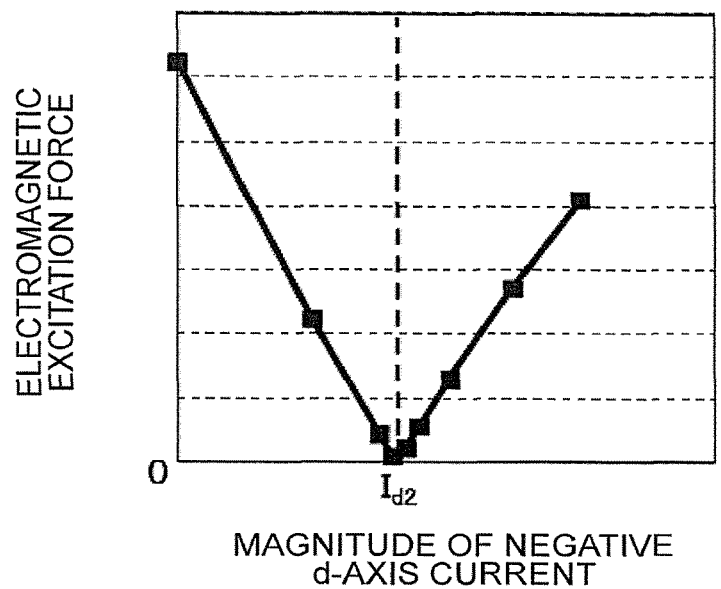
FIG. 8 is an explanatory diagram of a relationship, worked out by magnetic field analysis, between a negative d-axis current and electromagnetic excitation force of deformation mode 6/second-order time order in the permanent-magnet-type rotating electrical machine according to Embodiment 1 of the present invention.

FIG. 8 is an explanatory diagram of a relationship, worked out by magnetic field analysis, between a negative d-axis current and electromagnetic excitation force of deformation mode 6/second-order time order in the permanent-magnet-type rotating electrical machine according to Embodiment 1 of the present invention. The electromagnetic excitation force of deformation mode 6/second-order time order occurring in the permanent-magnet-type rotating electrical machine 1 according to Embodiment 1 of the present invention arises from a combination of for instance flux density components (15, 1) and (21, -1) occurring in the gap 5, where the (15, 1) component is a component contributing to torque.

Therefore, the electromagnetic excitation force of deformation mode 6/second-order time order can be suppressed if the flux density component (21, -1) occurring in the gap 5 can be reduced. The flux density component (21, -1) occurring in the gap 5 arises from the flux density component (21, -1) generated by the rotor 4 and the flux density component (21, -1) generated by the stator 2.

If the phases of these two flux density components are precisely reversed, then the phases can cancel each other out, and a state is brought about where in a current vector relationship there is only negative d-axis current energization. In FIG. 7, therefore, a negative d-axis current $I_{d2}$ for which the electromagnetic excitation force is substantially 0 is brought to a state such that the flux density component (21, -1) generated by the rotor 4 and the flux density component (21, -1) generated by the stator 2 cancel each other precisely.

As described above, NPL 1 discloses a calculation method of the negative d-axis current $I_{d2}$ for which electromagnetic excitation force is minimal. A problem arises in that at specific revolutions at which the electromagnetic excitation force matches the deformation mode and natural frequency of a structure such as the stator 2 or a frame, not shown, the electromagnetic excitation force resonates with that structure, giving rise to noise.

In a case where the negative d-axis current $I_{d1}$ required for voltage suppression at such specific revolutions is larger than the negative d-axis current $I_{d2}$ for which the electromagnetic excitation force is minimized, a problem arises in that the permanent-magnet-type rotating electrical machine 1 cannot be driven with the negative d-axis current $I_{d2}$ for which the electromagnetic excitation force is minimized, since the permanent-magnet-type rotating electrical machine 1 is driven with the negative d-axis current $I_{d1}$ required for voltage suppression.

Figure 9:
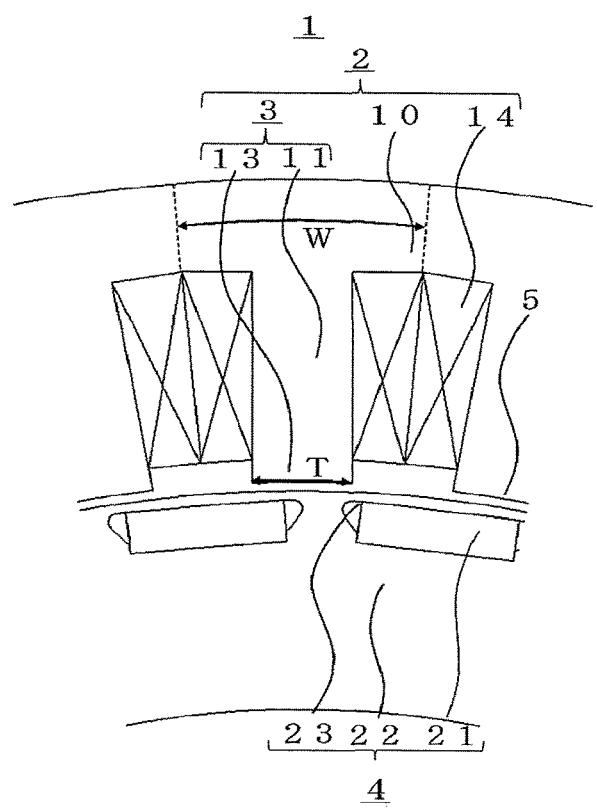
FIG. 9 is an enlarged-view diagram of an enlargement of a cross-section, perpendicular to the axial direction, of an ordinary permanent-magnet-type rotating electrical machine.
Figure 10:
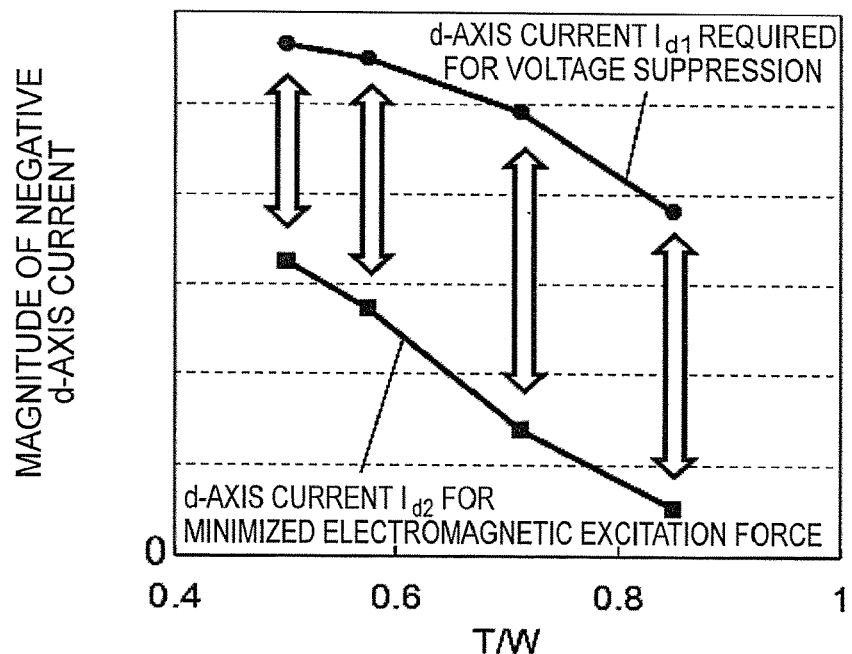
FIG. 10 is an explanatory diagram of a relationship, worked out by magnetic field analysis, between the electrical angle of the tooth tip section with respect to an electrical angle per slot, a negative d-axis current required for voltage suppression, and a negative d-axis current for which electromagnetic excitation force is minimized in the permanent-magnet-type rotating electrical machine according to Embodiment 1 of the present invention.

FIG. 9 is an enlarged-view diagram of an enlargement of a cross-section, perpendicular to the axial direction, of an ordinary permanent-magnet-type rotating electrical machine. FIG. 10 is an explanatory diagram of a relationship, worked out by magnetic field analysis, between the electrical angle of the tooth tip section with respect to the electrical angle per slot, the negative d-axis current required for voltage suppression, and the negative d-axis current for which the electromagnetic excitation force is minimized, in the permanent-magnet-type rotating electrical machine according to Embodiment 1 of the present invention.

Specifically, FIG. 10 is an explanatory diagram of a relationship, worked out by magnetic field analysis, between: T/W resulting from normalizing, by the electrical angle W per slot, the electrical angle T of the tooth tip section 13 illustrated in FIG. 9 in a case where the electrical angle T is caused to vary; the negative d-axis current $I_{d1}$ required for voltage suppression at given revolutions; and the negative d-axis current $I_{d2}$ for which the electromagnetic excitation force of deformation mode 6/second-order time order is minimized.

FIG. 10 reveals that the negative d-axis current $I_{d2}$ for which the electromagnetic excitation force of deformation mode 6/second-order time order is minimized increases with decreasing T/W, i.e. with decreasing angle T of the tooth tip section 13.

The underlying cause is as follows. The flux density component (21, −1) generated by the rotor 4 arises as a combination of the magnetomotive force component (15, 1) of the permanent magnets 21 and the variation component (36, 0) of magnetoresistance derived from the number of slots of the stator 2; hence, in a case where the magnetomotive force of the permanent magnets 21 is constant, the variation component (36, 0) of magnetoresistance derived from the number of slots of the stator 2 increases when the angle T of the tooth tip section 13 decreases, and, as a result, there increases the flux density component (21, −1) occurring in the gap 5.

Therefore, the negative d-axis current necessary in order to cancel the flux density component (21, −1) occurring in the gap 5 increases due to the increase in the flux density component, and hence the negative d-axis current $I_{d2}$ for which the electromagnetic excitation force of deformation mode 6/second-order time order is minimized increases as the angle T of the tooth tip section 13 is made smaller.

FIG. 10 reveals that the negative d-axis current $I_{d1}$ required for voltage suppression at a time of given revolutions likewise increases with decreasing angle T of the tooth tip section 13. That is because the negative d-axis current $I_{d1}$ required for voltage suppression increases as a result of an increase of the flux interlinked with the windings 14, since the amount of leakage of flux generated by the rotor 4 towards adjacent teeth 3 of the stator 2 decreases with decreasing angle T of the tooth tip section 13.

An instance has been thus illustrated wherein the negative d-axis current $I_{d2}$ for which the electromagnetic excitation force of deformation mode 6/second-order time order is minimized increases with decreasing angle T of the tooth tip section 13. Accordingly, the flange 12 is formed to allow reducing the magnitude of the d-axis current $I_{d1}$, without modifying the d-axis current $I_{d2}$, in order to promote leakage of flux generated by the permanent magnets 21 without alteration of the shape of the tooth tip section 13, so that there is no variation in the negative d-axis current $I_{d2}$ for which the electromagnetic excitation force of deformation mode 6/second-order time order is minimized.

As a result, it becomes possible to drive the permanent-magnet-type rotating electrical machine 1 at the negative d-axis current $I_{d2}$ for which the electromagnetic excitation force of deformation mode 6/second-order time order is minimized, at specific revolutions at which the deformation mode and natural frequency of a structure such as the stator 2 or a frame, not shown, match the electromagnetic excitation force.

Figure 11:
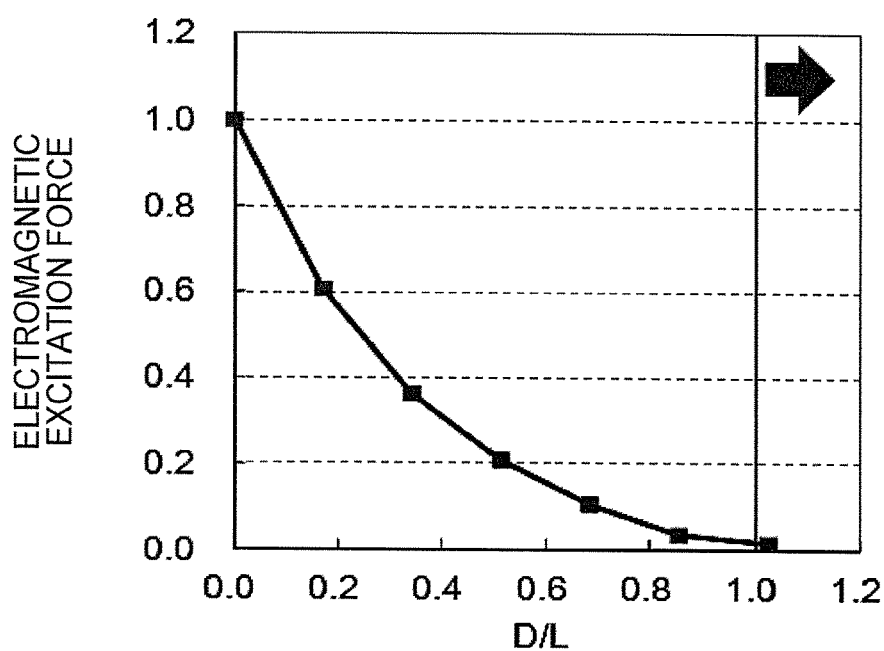
FIG. 11 is an explanatory diagram of a relationship, worked out by magnetic field analysis, between a ratio D/L of a distance D and a distance L and electromagnetic excitation force in the permanent-magnet-type rotating electrical machine according to Embodiment 1 of the present invention.
Figure 12:
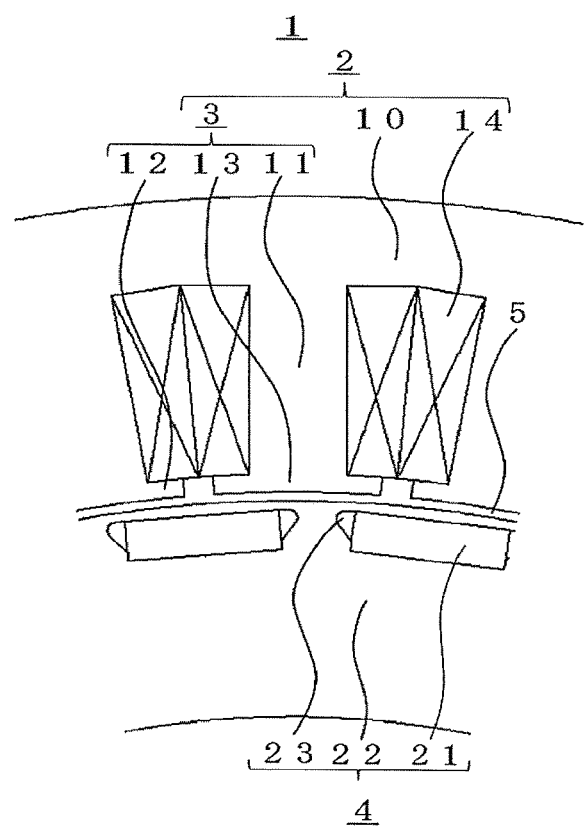
FIG. 12 is an enlarged-view diagram of an enlargement of a cross-section, perpendicular to the axial direction, of a permanent-magnet-type rotating electrical machine, in a case where a ratio D/L of a distance D and a distance L is D/L=0.
Figure 13:
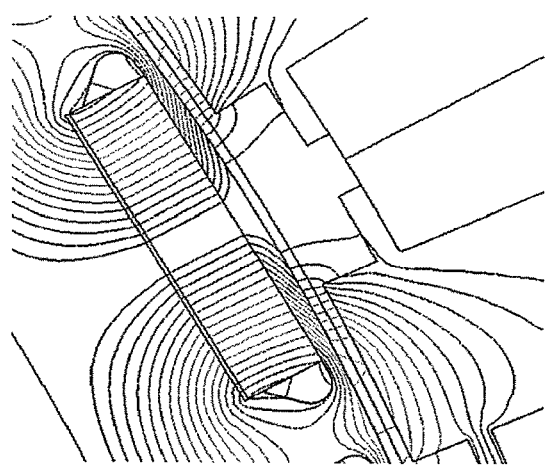
FIG. 13 is an explanatory diagram illustrating flux lines, obtained through magnetic field analysis, in a permanent-magnet-type rotating electrical machine in a case where a ratio D/L of a distance D and a distance L is D/L=1.

FIG. 11 is an explanatory diagram of a relationship, worked out by magnetic field analysis, between a ratio D/L of the distance D and distance L and the electromagnetic excitation force in the permanent-magnet-type rotating electrical machine according to Embodiment 1 of the present invention. FIG. 12 is an enlarged-view diagram of an enlargement of a cross-section, perpendicular to the axial direction, of a permanent-magnet-type rotating electrical machine, in a case where the ratio D/L of the distance D and the distance L is D/L=0. FIG. 13 is an explanatory diagram illustrating flux lines, obtained through magnetic field analysis, in a permanent-magnet-type rotating electrical machine in a case where the ratio D/L of the distance D and the distance L is D/L=1.

Specifically, FIG. 11 illustrates results, worked out by magnetic field analysis, of a relationship between a value D/L resulting from normalizing the above distance D being an indicator of the height of the flange 12, by the above distance L, and the electromagnetic excitation force of deformation mode 6/second-order time order. As illustrated in FIG. 12, the flange takes on a conventional flange shape in a case where D/L=0.

FIG. 11 reveals that when the distance D increases the electromagnetic excitation force of deformation mode 6/second-order time order decreases, since there decreases width of equivalent teeth 3 including the flange 12, as viewed from the rotor 4 side, with the electromagnetic excitation force becoming substantially 0 when D/L≥1. The flux lines for D/L=1 are as illustrated in FIG. 13.

By setting thus the distance D to be large, the flux generated by the permanent magnets 21 becomes directly interlinked with the windings 14 from the tooth tip section 13, without going through the flange 12, and the equivalent tooth width when the flange 12 is provided matches the width of the tooth tip section 13. That is, the flux generated by the permanent magnets 21 can be thought of in terms of the relationship between the position of the permanent magnets 21 and the distance up to the surface of the stator 2 on the rotor 4 side, in particular the distance to the gap 5.

The magnetoresistance of the gap 5 is dominant in the magnetic path of the flux generated by the permanent magnets 21, and hence the flux becomes interlinked with the surface of the stator 2 on the rotor 4 side in such a manner that the gap from the central portion of the permanent magnets 21 on the stator 2 side is shortest. Therefore, the relationship between the distance D and the distance L can be calculated on the basis of these relationships, and the flux of the permanent magnets 21 becomes interlinked with the tooth tip section 13 when D/L≥1. The flange 12 can be thus provided without modifying the negative d-axis current $I_{d2}$ for which the electromagnetic excitation force of deformation mode 6/second-order time order is minimized.

Figure 14:
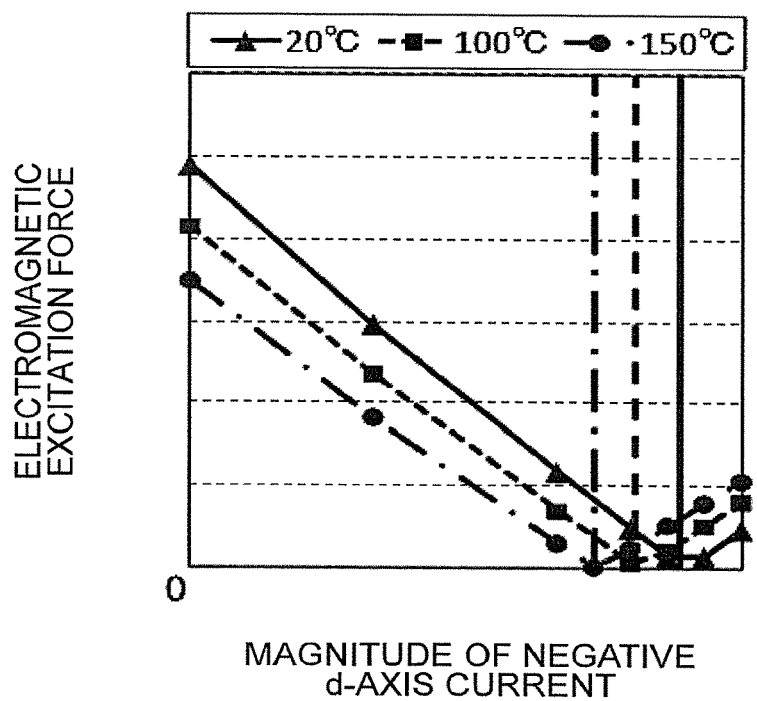
FIG. 14 is an explanatory diagram of a relationship, worked out by magnetic field analysis, between a negative d-axis current and electromagnetic excitation force in the permanent-magnet-type rotating electrical machine according to Embodiment 1 of the present invention, for respective magnet temperatures.

FIG. 14 is an explanatory diagram of a relationship, worked out by magnetic field analysis, between a negative d-axis current and electromagnetic excitation force of deformation mode 6/second-order time order in the permanent-magnet-type rotating electrical machine according to Embodiment 1 of the present invention, for respective magnet temperatures. Specifically, FIG. 14 depicts magnetic field analysis results of the electromagnetic excitation force when the negative d-axis current is caused to vary, for respective magnet temperatures $T_m$ of 20° C., 100° C. and 150° C. FIG. 14 reveals that that when the magnet temperature $T_m$ varies, there varies likewise the flux density of the permanent magnets 21, and accordingly the negative d-axis current $I_{d2}$ for which the electromagnetic excitation force is minimized varies as well.

In Embodiment 1 of the present invention, the torque control unit 70, which has a storage unit, generates the negative d-axis current $I_d*$ for which the electromagnetic excitation force is minimized in accordance with the magnet temperature $T_m$, at specific revolutions at which the stator 2 or a frame or the like, not shown, resonates on account of the electromagnetic excitation force. The relationship between the magnet temperature $T_m$ and the negative d-axis current $I_d$ for which the electromagnetic excitation force is minimized is calculated on the basis of magnetic field analysis or through actual measurement.

Figure 15:
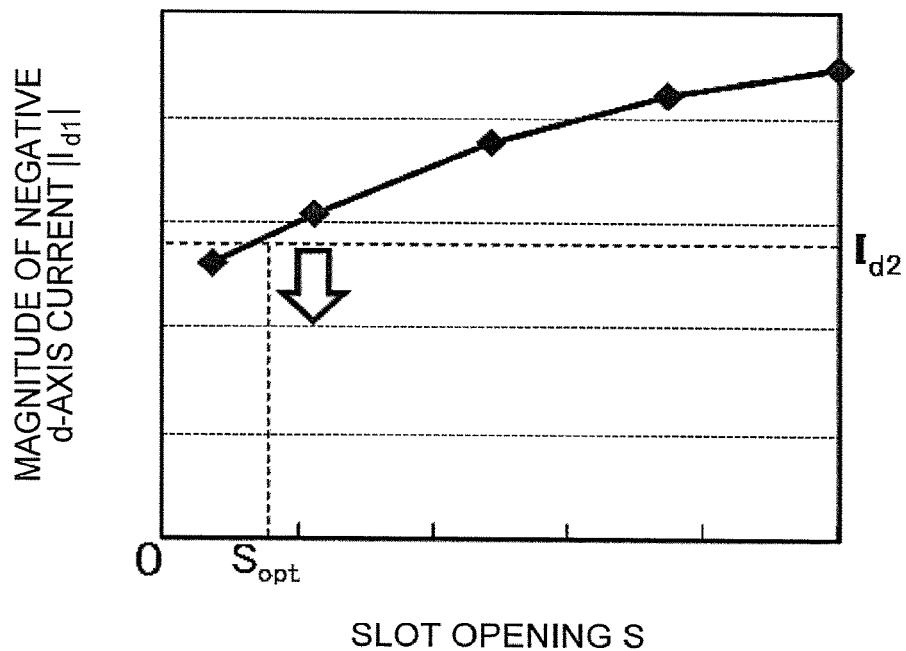
FIG. 15 is an explanatory diagram illustrating the relationship between a negative d-axis current required for voltage suppression and width between adjacent flanges, in the permanent-magnet-type rotating electrical machine according to Embodiment 1 of the present invention.

The effect of the permanent-magnet-type rotating electrical machine 1 having the above configuration will be explained next. FIG. 15 is an explanatory diagram illustrating the relationship between the negative d-axis current required for voltage suppression and the width between adjacent flanges, in the permanent-magnet-type rotating electrical machine according to Embodiment 1 of the present invention. Specifically, FIG. 15 depicts the change in negative d-axis current $I_{d1}$ required for voltage suppression, upon variation of the width (slot opening) S between adjacent flanges 12, in a case where the ratio D/L of the distance D and the distance L is D/L=1.

FIG. 15 reveals that the negative d-axis current $I_{d1}$ required for voltage suppression decreases as the slot opening S is made narrower, and the negative d-axis current $I_{d1}$ can be made smaller than the negative d-axis current $I_{d2}$ for which the electromagnetic excitation force of deformation mode 6/second-order time order is minimized.

By forming thus the flange 12 so that D/L≥1, it becomes possible to promote leakage flux and to curtail the negative d-axis current required for voltage suppression, and hence it becomes possible to drive the permanent-magnet-type rotating electrical machine 1 at or above a magnitude of the negative d-axis current $I_{d1}$ required for voltage suppression, and at the negative d-axis current $I_{d2}$ for which the electromagnetic excitation force of deformation mode 6/second-order time order is minimized.

Figure 16:
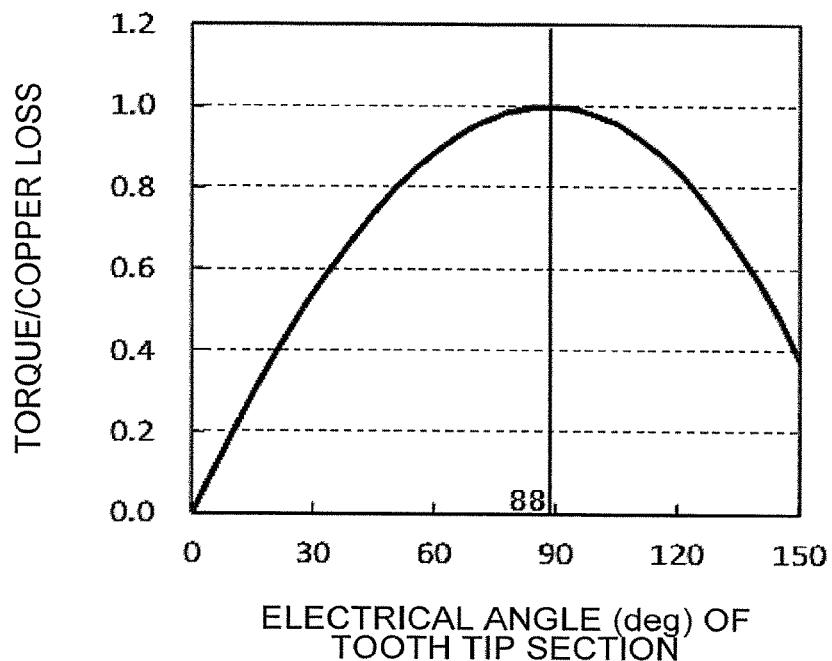
FIG. 16 is an explanatory diagram illustrating a relationship between the electrical angle of the tooth tip section and torque/copper loss in the permanent-magnet-type rotating electrical machine according to Embodiment 1 of the present invention.

FIG. 16 is an explanatory diagram illustrating the relationship between the electrical angle of the tooth tip section and torque/copper loss in the permanent-magnet-type rotating electrical machine according to Embodiment 1 of the present invention. In FIG. 16, torque increases with increasing width (electrical angle) of the tooth tip section 13, in a case where the width of the tooth tip section 13 and the width of the portion around which the winding 14 is wound are identical. Meanwhile, the slot surface area at the insertion portion of the winding 14 is small, and accordingly copper loss is large.

As a result, torque/copper loss becomes maximal in a case where the electrical angle of the tooth tip section 13 is 88° as illustrated in FIG. 16. Therefore, the width (electrical angle) of the tooth tip section 13 is determined such that the torque/copper loss is maximal, with the electrical angle T of the tooth tip section 13 being set to satisfy 51°<electrical angle T of the tooth tip section 13<122°, to yield 80% or more of torque/copper loss normalized by the maximum value of the latter. Torque/copper loss can be maximized as a result.

The teeth 3 exhibit magnetic saturation at maximum torque and hence FIG. 16 is calculated assuming that the amount of flux related to maximum torque is proportional to the sectional area of the teeth 3, and assuming that copper loss is proportional to the slot surface area at the insertion portion of the winding 14, taking into consideration the magnitude of the distance D being an indicator of the height of the flange 12. Torque/copper loss can be made as a result 80% or more normalized by the maximum value, and hence the efficiency of the permanent-magnet-type rotating electrical machine 1 can be increased.

Figure 17:
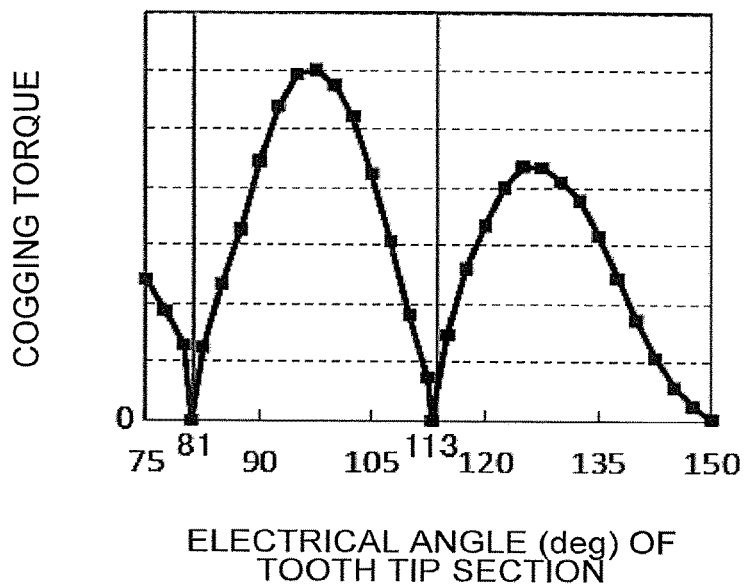
FIG. 17 is an explanatory diagram of a relationship, worked out by magnetic field analysis, between the electrical angle of the tooth tip section and cogging torque in the permanent-magnet-type rotating electrical machine according to Embodiment 1 of the present invention.

FIG. 17 is an explanatory diagram of a relationship, worked out by magnetic field analysis, between the electrical angle of the tooth tip section and cogging torque in the permanent-magnet-type rotating electrical machine according to Embodiment 1 of the present invention. FIG. 17 suggests the feature of establishing the electrical angle T of the tooth tip section 13 such that cogging torque is minimized.

As illustrated In FIG. 17, there can be set 79°<electrical angle T of the tooth tip section 13<83° or 111°<electrical angle T of the tooth tip section 13<115°, when the electrical angle T of the tooth tip section 13 is set to about ±2 degrees of the angle at which cogging torque is minimized, with manufacturing error in mind. As a result, cogging torque can be kept to a minimum while improving the efficiency of the permanent-magnet-type rotating electrical machine 1.

Figure 18:
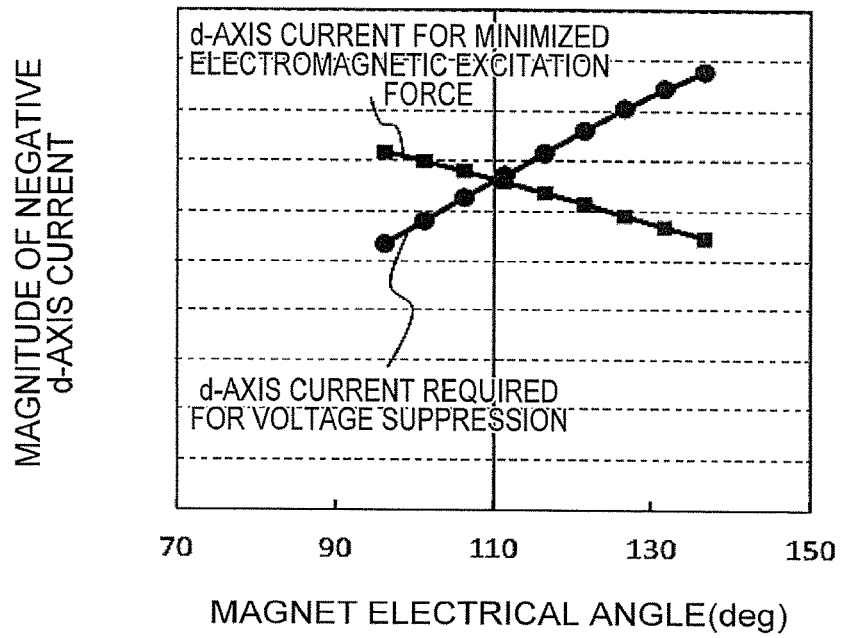
FIG. 18 is an explanatory diagram of a relationship, worked out by magnetic field analysis, between a magnet electrical angle, a negative d-axis current required for voltage suppression and a negative d-axis current at which the electromagnetic excitation force is minimized, in the permanent-magnet-type rotating electrical machine according to Embodiment 1 of the present invention.

FIG. 18 is an explanatory diagram of a relationship, worked out by magnetic field analysis, between a magnet electrical angle, a negative d-axis current required for voltage suppression, and a negative d-axis current for which the electromagnetic excitation force is minimized, in the permanent-magnet-type rotating electrical machine according to Embodiment 1 of the present invention.

As FIG. 18 reveals, the magnitude of the negative d-axis current $I_{d2}$ for which the electromagnetic excitation force is minimized increases with decreasing width (electrical angle) of the permanent magnets 21 in the circumferential direction, and hence it is preferable to establish the electrical angle of the permanent magnets 21 in such a way so as to match the d-axis current $I_{d1}$ required for voltage suppression.

The magnitude of the negative d-axis current $I_{d2}$ for which the electromagnetic excitation force is minimized may be equal to or greater than the d-axis current $I_{d1}$ required for voltage suppression. As a result, the negative d-axis current $I_{d1}$ can be further curtailed, and hence it becomes possible to drive the permanent-magnet-type rotating electrical machine 1 at or above the magnitude of the negative d-axis current $I_{d1}$ required for voltage suppression, and at the negative d-axis current $I_{d2}$ for which the electromagnetic excitation force of deformation mode 6/second-order time order is minimized.

The negative d-axis current $I_{d1}$ required for voltage suppression increases with increasing revolutions of the rotor 4, and hence the electrical angle of the width (slot opening) S of adjacent flanges 12 is set to lie in the range of 0 to 0.3 times the electrical angle of the width of the tooth tip section 13, at or below revolutions of 10,000 r/min.

In Embodiment 1 of the present invention, the permanent magnets 21 are embedded in the rotor 4; therefore, the electromagnetic excitation force can be minimized while exploiting reluctance torque, through energization with the negative d-axis current $I_{d2}$ for which the electromagnetic excitation force is minimized. In an embedded magnet-type rotating electrical machine, specifically, the permanent magnets 21 are embedded in the interior of the rotor 4. Therefore, no member is required in order to hold the permanent magnets 21, and reluctance torque can be utilized, thanks to which torque can be increased.

In Embodiment 1 of the present invention there are used two sets of three-phase windings; accordingly efficiency is high, the winding coefficient higher, and torque is increased. Specifically, torque can be increased since higher efficiency can be realized, with a higher winding coefficient, by virtue of such dual three-phase driving.

A permanent-magnet-type rotating electrical machine 1 having 30 poles and 36 slots was used in the explanation of Embodiment 1 of the present invention, but the invention is not limited thereto, and the present invention can be used also in the case of ordinary three-phase windings so long as the relationship between the number of poles and the number of slots is 6±1:6. Other deformation modes and time orders may be targeted herein. In particular, cogging torque can be reduced in 5-pole 6-slots constructions.

In Embodiment 1 of the present invention, the currents $I_d$, $I_q$ in the dq-axes as used for control of the rotating electrical machine are calculated through averaging of two sets of d-axis currents and q-axis currents, but the present invention is not limited thereto, and the currents may be controlled individually.

Figure 19:
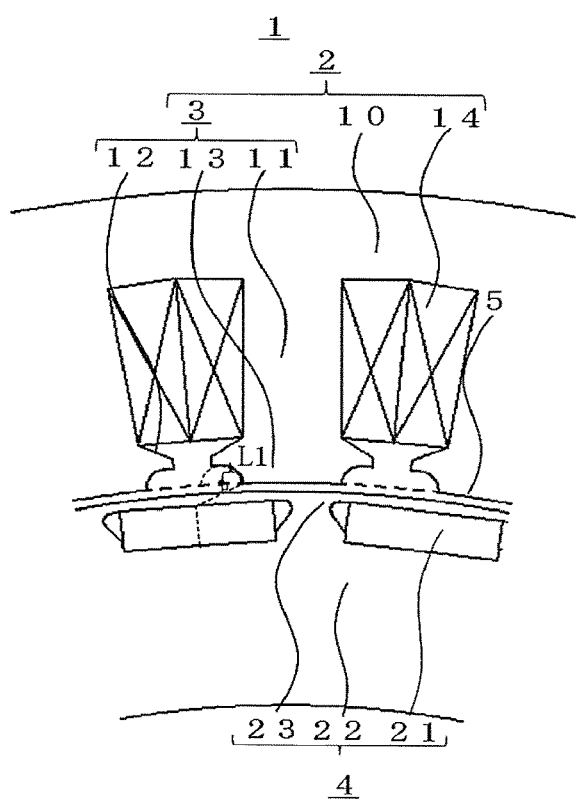
FIG. 19 is another cross-sectional diagram of an enlargement of a cross-section, perpendicular to the axial direction, of the permanent-magnet-type rotating electrical machine according to Embodiment 1 of the present invention.

In Embodiment 1 of the present invention, the flange 12 is formed so as to satisfy D/L≥1, and the rotor 4-side surface of the flange 12 is formed to be parallel to the rotor core 22, but the invention is not limited thereto, and it suffices herein that the flange 12 be formed on the outer side of an arc of radius L as defined in Expression (1) above. That is, there may be formed a flange 12 such as the one depicted in FIG. 19, which illustrates another enlarged-view diagram of an enlargement of a cross-section, perpendicular to the axial direction, of the permanent-magnet-type rotating electrical machine according to Embodiment 1 of the present invention.

Embodiment 1 of the present invention has been explained on the basis of an example of the permanent-magnet-type rotating electrical machine 1 of inner rotor type in which the stator 2 is disposed outside and the rotor 4 is disposed inside, but the invention is not limited thereto, and a permanent-magnet-type rotating electrical machine of outer rotor type in which the positions of the stator 2 and the rotor 4 are swapped may be used. The permanent magnets 21 are configured using rare earth magnets such as neodymium magnets, but sintered magnets such as samarium cobalt magnets or ferrite magnets, bonded magnets, and other magnets may be used.

In Embodiment 1, thus, given a first intersection point of the rotor surface and a straight line that joins a central point of a permanent magnet on the stator side and the tooth tip section closest to the central point of the permanent magnet on the stator side, the flange is formed outward of an arc having, as the radius thereof, a distance from a second intersection point of the stator inner peripheral face and a straight line that joins the rotation axis of the rotor and the first intersection point, up to the tooth tip section.

Accordingly, it becomes possible to drive the permanent-magnet-type rotating electrical machine with a negative d-axis current for which the electromagnetic excitation force is minimized, at specific revolutions at which the electromagnetic excitation force matches the resonant frequency of parts of the rotating electrical machine.

Specifically, the flange is formed so as not to influence electromagnetic the excitation force, and the width of each tooth tip section and the width between adjacent flanges are established in such a manner that the negative d-axis current at which electromagnetic excitation force is minimized is kept within an operation-enabling current condition, at specific revolutions at which the electromagnetic excitation force matches the deformation mode and the natural frequency of a structure such as the stator or a frame.

By forming the flange between the tooth central section and the tooth tip section of the stator it becomes possible to reduce the d-axis current required for voltage suppression, while promoting leakage flux, and without affecting the negative d-axis current for which the electromagnetic excitation force is minimized. When the minimum height H of the flange is equal to or greater than half the body width B of the tooth central section 11, the main magnetic flux generated by the permanent magnets 21 flows between the flanges, and when the minimum height of the flange is smaller than half the tooth tip width, the main magnetic flux generated by the permanent magnets 21 becomes interlinked with the tooth central section 11, and accordingly drops in torque are curtailed.

Embodiment 2

Figure 20:
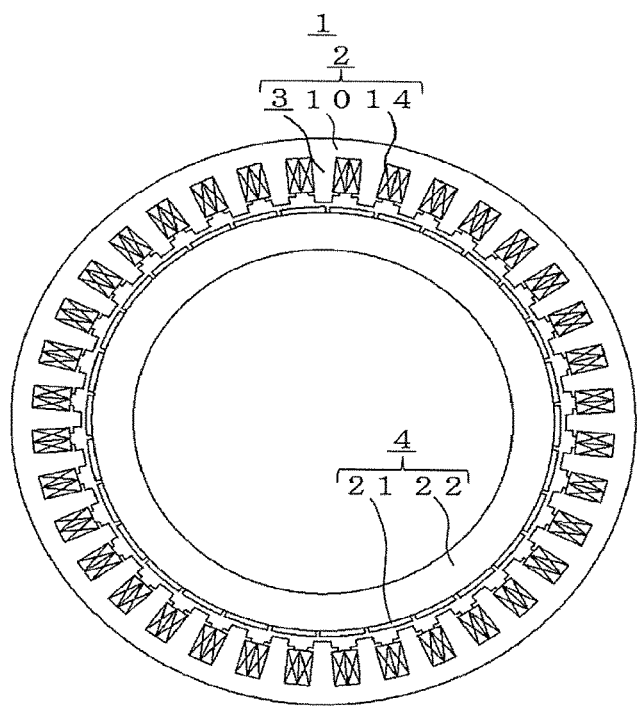
FIG. 20 is a cross-sectional diagram, perpendicular to the axial direction, of a permanent-magnet-type rotating electrical machine according to Embodiment 2 of the present invention.

FIG. 20 is a cross-sectional diagram of a permanent-magnet-type rotating electrical machine according to Embodiment 2 of the present invention perpendicular to the axial direction. The permanent-magnet-type rotating electrical machine 1 illustrated in FIG. 20 is a permanent-magnet-type rotating electrical machine 1 having 30 poles and 36 slots. In FIG. 20, the teeth 3 have a tapered shape and the slots around which the windings 14 are wound are parallel to each other.

The permanent magnets 21 of substantially rectangular shape are disposed on the surface of the rotor core 22 of the rotor 4. Herein the rotor core 22 is coated with an adhesive and has the permanent magnets 21 bonded thereto, or alternatively the rotor 4 is inserted in a cylindrical protective tube such as a SUS tube, to prevent the permanent magnets 21 from scattering.

Figure 21:
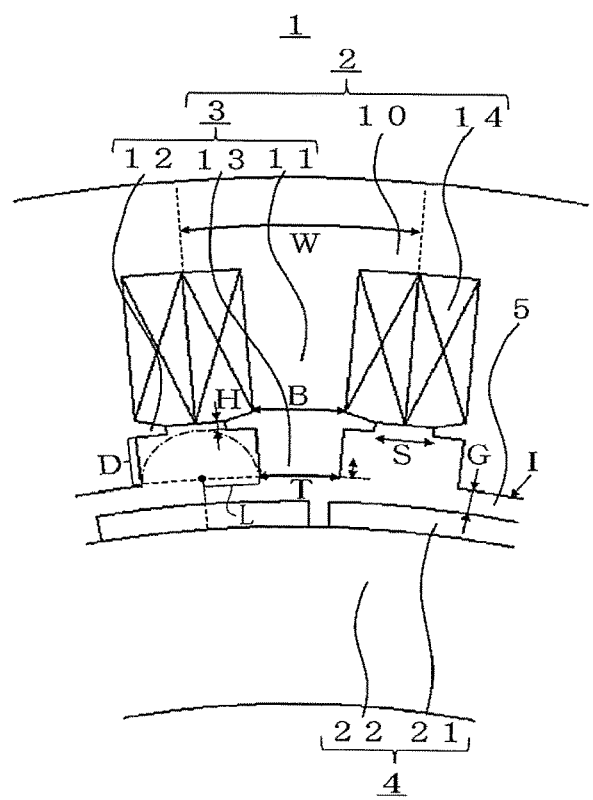
FIG. 21 is an enlarged-view diagram of an enlargement of a cross-section, perpendicular to the axial direction, of the permanent-magnet-type rotating electrical machine according to Embodiment 2 of the present invention.

FIG. 21 is an enlarged-view diagram of an enlargement of a cross-section, perpendicular to the axial direction, of the permanent-magnet-type rotating electrical machine according to Embodiment 2 of the present invention. In FIG. 21, the rotor core 22 is not formed outside the permanent magnets 21 in the permanent-magnet-type rotating electrical machine 1 having the surface magnet structure illustrated in FIG. 20, and hence L is calculated with M set to 0 in Expression (1) above, and the flange 12 is formed so that there holds D/L≥1.

In Embodiment 2, the core cross-sectional area of the teeth 3 can be increased, and magnetic saturation relaxed, by forming the teeth 3 to a tapered shape, and hence the maximum torque can be increased. Further, short-circuit flux at the ends of the magnets can be curtailed by providing the permanent magnets 21 on the surface of the rotor 4. Therefore, the magnet flux interlinked with the stator 2 can be effectively utilized, and torque can be increased.

Embodiment 3

Figure 22:
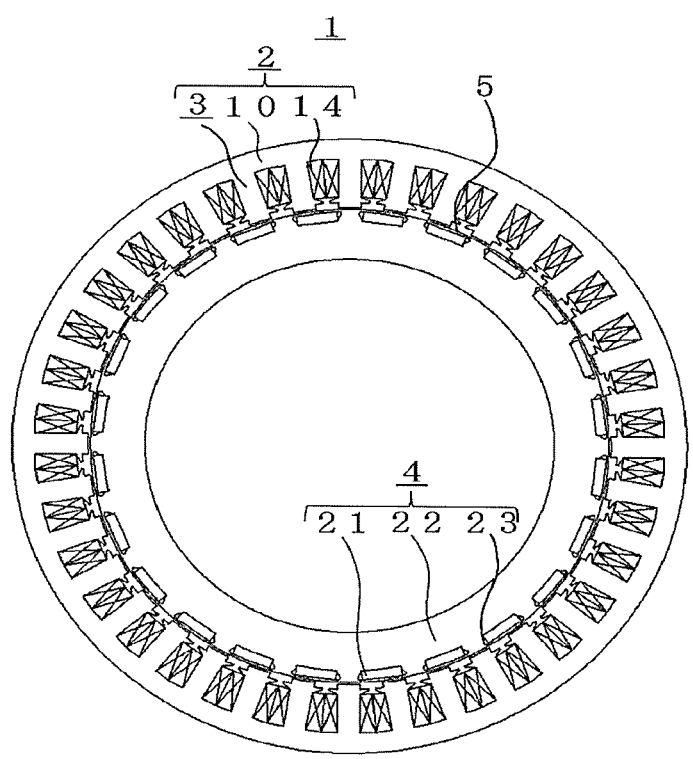
FIG. 22 is a cross-sectional diagram, perpendicular to the axial direction, of a permanent-magnet-type rotating electrical machine according to Embodiment 3 of the present invention.

FIG. 22 is a cross-sectional diagram, perpendicular to the axial direction, of a permanent-magnet-type rotating electrical machine according to Embodiment 3 of the present invention. The permanent-magnet-type rotating electrical machine 1 illustrated in FIG. 22 is a permanent-magnet-type rotating electrical machine 1 having 24 poles and 36 slots.

It is ordinarily known that a permanent-magnet-type rotating electrical machine 1 of concentrated winding, having windings 14 wound densely around the teeth 3, has a peak value of electromagnetic excitation force for a low-order deformation mode/time order, as described above. The deformation mode/time order of the electromagnetic excitation force occurring in the permanent-magnet-type rotating electrical machine 1 will be explained next.

The electromagnetic excitation force arises for a specific deformation mode/time order as a result of a combination of harmonic components of flux density in the gap 5, the harmonic components arising in turn according to the number of slots of the stator 2 and the number of poles of the rotor 4.

A harmonic component $B_{rt}$ of flux density generated by the rotor 4 results from a combination of the magnetomotive force $f_{mg}$ generated by the permanent magnets 21 and a variation $p_{st}$ in magnetoresistance derived from the number of slots of the stator 2. The harmonic component $B_{rt}$ is given by Expression (2) above.

In the rotor 4 having 24 poles, specifically, there arise components such as (12, 1), (24, 2), (36, 3) as the magnetomotive force ($x_{fmg}$, $y_{fmg}$) of the permanent magnets 21. In the stator 2 having 36 slots there arise for instance (0, 0), (36, 0), (72, 0) as the variation component ($x_{pst}$, $y_{pst}$) of magnetoresistance. The harmonic component ($x_{Brt}$, $y_{Brt}$) of flux density generated by the rotor 4 results from a combination given by Expression (7) below.

[Math. 7]

$$(x3_{Brt}, y3_{Brt})=(12, 1)=(12, 1)+(0, 0)$$

$$(x4_{Brt}, y4_{Brt})=(24, -1)=-(12, 1)+(36, 0) \quad (7)$$

The harmonic component $B_{st}$ of the flux density generated by the stator 2 results from a combination of the magnetomotive force $f_{st}$ generated by the windings 14 of the stator 2 and the variation $p_{rt}$ in magnetoresistance derived from the rotor 4, as given by Expression (4) above.

Specifically, there arise components such as (12, 1), (24, −1) as the magnetomotive force ($x_{fst}$, $y_{fst}$) generated by the windings 14 of the permanent-magnet-type rotating electrical machine 1 according to Embodiment 3 of the present invention. In the rotor 4 there arises for instance (0, 0) as the variation component ($x_{prt}$, $y_{prt}$) of magnetoresistance. Herein the harmonic component ($x_{Bst}$, $y_{Bst}$) of flux density generated by the stator 2 results from a combination given by Expression (8) below.

[Math. 8]

$$(x3_{Bst}, y3_{Bst})=(12, 1)=(12, 1)+(0, 0)$$

$$(x4_{Bst}, y4_{Bst})=(24, -1)=(24, -1)+(0, 0) \quad (8)$$

As is known, the electromagnetic excitation force $f_{emf}$ is proportional to the square of flux density occurring in the gap 5, on the basis of the relational expression of Maxwell stress given by Expression (6) above.

In the permanent-magnet-type rotating electrical machine 1 according to Embodiment 3 of the present invention, therefore, there arise components ((24, −1)-(12, 1)) of deformation mode 12/second-order time order, for instance derived from flux density components (12, 1), (24, −1 occurring in the gap 5.

The electromagnetic excitation force of deformation mode 12/second-order time order can be suppressed if the flux density component (24, −1) occurring in the gap 5 can be reduced. The flux density component (24, −1) occurring in the gap 5 arises from the flux density component (24, −1) generated by the rotor 4 and the flux density component (24, −1) generated by the stator 2.

If the phases of these two flux density components are precisely reversed, then the phases can cancel each other out, and a state is brought about where in a current vector relationship there is only negative d-axis current energization. As in the case of Embodiment 1, therefore, a state where the flux density component (24, −1) generated by the rotor 4 and the flux density component (24, −1) generated by the stator 2 cancel each other precisely is brought about through energization with the negative d-axis current.

In Embodiment 3 as well, it becomes thus possible to drive the permanent-magnet-type rotating electrical machine with a negative d-axis current for which the electromagnetic excitation force is minimized, at specific revolutions at which the electromagnetic excitation force matches the resonant frequency of parts of the rotating electrical machine.

By forming the flange between the tooth central section and the tooth tip section of the stator it becomes possible to reduce the d-axis current required for voltage suppression, while promoting leakage flux, and without affecting the negative d-axis current for which the electromagnetic excitation force is minimized.

In Embodiment 3, an example has been illustrated of a permanent-magnet-type rotating electrical machine 1 having 24 poles and 36 slots, but a permanent-magnet-type rotating electrical machine 1 having a number of poles and a number of slots that are natural-number multiples of two poles and three slots, as a minimum unit, can elicit an effect similar to that of Embodiment 3 of the present invention, since the positional relationship between the permanent magnets 21 and the teeth 3 remains unchanged.

The invention claimed is:

1. A permanent-magnet-type rotating electrical machine comprising a rotor that forms a magnetic field using permanent magnets, and a stator that opposes the rotor across a gap,
   wherein the stator has teeth protruding towards the rotor side, and a core back,
   the teeth each include a tooth central section around which a winding is wound, a tooth tip section which opposes the rotor and around which no winding is wound, and a flange which is formed between the tooth central section and the tooth tip section and protrudes on both sides in a circumferential direction, and
   given a first intersection point of a surface of the rotor and a straight line that joins a central point of a permanent magnet on the stator side and the tooth tip section closest to the central point of the permanent magnet on the stator side, the flange is formed outward of an arc having, as the radius thereof, a maximum value, for all rotation angles of the rotor, among a distance from a second intersection point of an inner peripheral face of the stator and a straight line that joins a rotation axis of the rotor and the first intersection point, up to the tooth tip section.

2. The permanent-magnet-type rotating electrical machine according to claim 1,
   wherein the minimum height of the flange is smaller than ½ the minimum width of the tooth central section.

3. The permanent-magnet-type rotating electrical machine according to claim 1,
   wherein the number of poles X of the rotor and the number of slots Y of the stator satisfy a relationship X:Y=6±1:6.

4. The permanent-magnet-type rotating electrical machine according to claim 1,
wherein an electrical angle T of the tooth tip section satisfies 51°<T<122°.

5. The permanent-magnet-type rotating electrical machine according to claim 4,
wherein the electrical angle T of the tooth tip section satisfies 79°<T<83° or 111°<T<115°.

6. The permanent-magnet-type rotating electrical machine according to claim 1,
wherein two or more sets of windings having mutually different time phases are wound around the teeth.

7. The permanent-magnet-type rotating electrical machine according to claim 1,
wherein the permanent magnets are embedded in the rotor.

8. A permanent-magnet-type rotating electrical machine, comprising a rotor that forms a magnetic field using permanent magnets, and a stator that opposes the rotor across a gap,
wherein the stator has teeth protruding towards the rotor side, and a core back,
the teeth each include a tooth central section around which a winding is wound, a tooth tip section which opposes the rotor and around which no winding is wound, and a flange which is formed between the tooth central section and the tooth tip section and protrudes on both sides in a circumferential direction,
given a first intersection point of a surface of the rotor and a straight line that joins a central point of a permanent magnet on the stator side and the tooth tip section closest to the central point of the permanent magnet on the stator side, the flange is formed outward of an arc having, as the radius thereof, a distance from a second intersection point of an inner peripheral face of the stator and a straight line that joins a rotation axis of the rotor and the first intersection point, up to the tooth tip section, and
the permanent-magnet-type rotating electrical machine is driven by a control device that converts a three-phase AC current with which the winding is energized to a d-axis current in a flux direction and a q-axis current in a torque direction, and that establishes, as a d-axis current command, a negative d-axis current for which electromagnetic excitation force is minimized, in accordance with the magnet temperature of the permanent magnets.

* * * * *